United States Patent [19]

Hilterhaus

[11] 4,352,895
[45] Oct. 5, 1982

[54] PROCESS AND DEVICE FOR THE CONTINUOUS PRODUCTION OF PLATES FROM FOAMED SYNTHETIC RESINS

[75] Inventor: Karl-Heinz Hilterhaus, Georgsmarienhütte, Fed. Rep. of Germany

[73] Assignee: Chemie-Anlagenbau Bischofsheim GmbH, Osnabruck, Fed. Rep. of Germany

[21] Appl. No.: 184,245

[22] Filed: Sep. 5, 1980

[30] Foreign Application Priority Data

Sep. 11, 1979 [DE] Fed. Rep. of Germany ....... 2936613

[51] Int. Cl.³ ............................................. B29D 27/04
[52] U.S. Cl. .................................... 521/99; 264/46.2; 246/46.5; 246/51; 425/224; 425/817 C
[58] Field of Search ................ 264/54, DIG. 84, 46.5, 264/46.2, 46.3, 51; 425/224, 817 C; 521/99

[56] References Cited

U.S. PATENT DOCUMENTS 3,240,846 3/1966 Voelker .............................. 264/46.2
3,249,486 5/1966 Voisinet et al. ................... 264/54 X
3,620,863 11/1971 Sullhofer ............................ 264/46.2
3,836,298 9/1974 Ernst ............................... 264/46.2 X
4,152,385 5/1979 Tabler ................................ 264/46.2

FOREIGN PATENT DOCUMENTS 1247612 8/1967 Fed. Rep. of Germany .

Primary Examiner—Philip Anderson
Attorney, Agent, or Firm—Stevens, Davis, Miller & Mosher

[57] ABSTRACT

The present invention provides a process for the continuous production of plates, which are optionally laminated on all sides, from foamed synthetic resins and especially from polyurethane hard foams, in which a foaming synthetic resin is passed through a channel formed by endless running bands, wherein the side bands are subjected to external pressure and press towards the middle of the plate, said side bands being pressed in the course of the foaming by the foaming pressure thereby arising into their actual side-limiting positions, said side bands finally assuming the positions which correspond to the desired plate breadth and contour.

The present invention also provides a device for taking up the lateral foam pressure in continuously operating band plants, comprising counterpressure devices which exert on the side bands, adapted to move in the plane of the plate, an optimum counterpressure for the reaction characteristics of the foaming synthetic resin.

8 Claims, 8 Drawing Figures

PROCESS AND DEVICE FOR THE CONTINUOUS PRODUCTION OF PLATES FROM FOAMED SYNTHETIC RESINS

The present invention is concerned with a process and a device for the continuous production of plates, optionally laminated on all sides, from foamed synthetic resins and especially from polyurethane hard foams, the foaming synthetic resin thereby being passed through a channel formed by endless running belts in which it foams and solidifies.

Processes of this kind have been known for a long time and are described, for example, in Federal Republic of Germany Patent Specification No. 1,247,612. The reaction mixture, which preferably consists of mixed polyurethane components, must first pass along a flow path of varying length on a lower band. This results in the edges having longitudinal zones of reduced density, which is especially due to coarse porosity. In the case of poorly flowing materials, for example highly filled polyurethane foamed materials systems, overlapping often takes place in the manner illustrated in FIG. 2 of the accompanying drawings. Therefore, attempts have already been made to avoid this by overfilling the "mould cross-section" with more mass (higher density) or more propellent, thus allowing the mass and/or propellent to flow from the mould cross-section. At the right moment, the foam must then be solidified to such an extent that it can build up pressure in the interior and thus find its support. In the case of processes using flexible covering layers, success is not complete so that the side edges are not uniformly formed. Therefore, all plate manufacturers subsequently trim the edges of the plates, comparatively large amounts of waste thereby being automatically obtained. Furthermore, due to the trimming of the lateral edges, the plates also lose the solid edge skin which would impart an additional stability to the plates.

The phenomenon of hollow space formation illustrated in FIG. 2 of the accompanying drawings is also found in the case of open mould foaming of comparatively large blocks, as can be seen from FIG. 3 of the accompanying drawings. In order to try to overcome this problem, the "floating cover" technique has been developed (see FIG. 4 of the accompanying drawings). In this case, a cover which can rise freely with the foam is loaded with sufficient weight to prevent the formation of the undesired hollow space.

Therefore, it is an object of the present invention to find a way which, similarly to the stationary production of large foamed material blocks, avoids the formation of hollow spaces and, at the same time, enables a more uniform density distribution to be achieved in the plate, especially in the edge zones, without additional trimming of the lateral edges being necessary.

According to the present invention, this object is achieved in that side bands subjected to external pressure and pressing towards the middle of the plate are only pressed into their actual side-limiting positions in the course of the foaming by the foaming pressure which occurs.

Thus, according to the present invention, there is provided a process for the continuous production of plates, which are optionally laminated on all sides, from foamed synthetic resins and especially from polyurethane hard foam materials, in which a foaming synthetic resin is passed through a channel formed by endless running bands, wherein the side bands are subjected to external pressure and press towards the middle of the plate, said side bands being pressed in the course of the foaming by the foaming pressure thereby arising into their actual side-limiting positions, said side bands finally assuming the positions which correspond to the desired plate breadth and contour.

The present invention also provides a device for taking up the lateral foam pressure in continuously operating band plants, comprising counterpressure devices which exert on the side bands, adapted to move in the plane of the plate, an optimum counterpressure for the reaction characteristics of the foaming synthetic resin.

The side bands movably arranged on both sides in the plane of the plate preferably consist of a flexible and/or rigid material. The counterpressure devices are preferably operated by means of spring force, the counterpressure action of which can be appropriately adjusted to the foaming pressure.

The counterpressure device can preferably be stopped in any position but preferably in the minimum and maximum position.

According to a preferred embodiment, recesses can be present in the side bands which serve for the reception of co-running profiled bands which subsequently form the lateral edges of the plates.

According to a modification of the present invention, it is also possible for the holding means for the side bands to be so rigidly mounted at the beginning of the channel that the distance between the two side bands is smaller than the subsequent final breadth of the plate. Only towards the middle of the length of the channel do the side bands finally assume a distance apart which corresponds to the breadth of the plate. The angle α which the side bands have at the beginning of the plant to the actual end position can be varied, depending upon the foaming material mixture, so that the channel volume to be filled increases to the same extent as the pressure increases.

The process and device according to the present invention are especially useful for the production of foamed material plates based on polyurethane hard foams, which foams can have a high content of filler materials, and for the production of those foamed materials which are obtained by the reaction of isocyanates in an alkaline medium in the presence of filling material.

With the help of the present invention, the generation of the "standing wave" at the commencement of the band, which is necessary for a continuous process, can now be undertaken not only by special catalysis of the mixture but also by counterpressure regulation of the side bands.

All components of the mixture to be foamed pass, in the first phase, along the same path from the lower up towards the upper covering layer. Only in the second phase is there a side push which is uniformly strong for all foam components. The point of time at which the side push is optimal for a given system can be preselected by the lateral counterpressure and the speed of movement. Bumps, such as are illustrated in FIG. 2 of the accompanying drawings, no longer occur. Overlappings in the direction counter to the direction of movement are suppressed by the narrowing moulding channel. The plates produced according to the present invention are preferably protected on all sides, other than the end face, by covering materials. Since trimming is no longer necessary, the pressure-stable lateral edges are also retained. Since overlapping does not occur in the region of the edges, the pore structure is uniform and thus the density distribution is also more uniform.

The present invention will now be explained with reference to FIGS. 1 to 8 of the accompanying drawings, FIGS. 2 to 4 of which having already been referred to in the preceding description. It is to be understood that FIGS. 1 to 8 of the accompanying drawings, insofar as they are not part of the prior art, only represent particular embodiments of the present invention, which is not limited thereto.

In the accompanying drawings:

FIG. 1 shows schematically an arrangement of the side bands 2 which are adapted to be movable not only in the longitudinal direction but also in the plane of the plate. It can clearly be seen that the moulding channel at the commencement of the plant is narrower than in the middle. Only then do the side bands 2 assume their final position so that a constant plate breadth is obtained. The side bands 2 lie against counterpressure devices 1 which are arranged side-by-side at short distances apart. (As already mentioned in the preceding description, the side bands at the commencement of the plant can be arranged in such a manner that they are movable in the longitudinal direction but not in the plane of the plate so that a wedge-shaped, conical or convex opening channel is then obtained).

Figure 1:
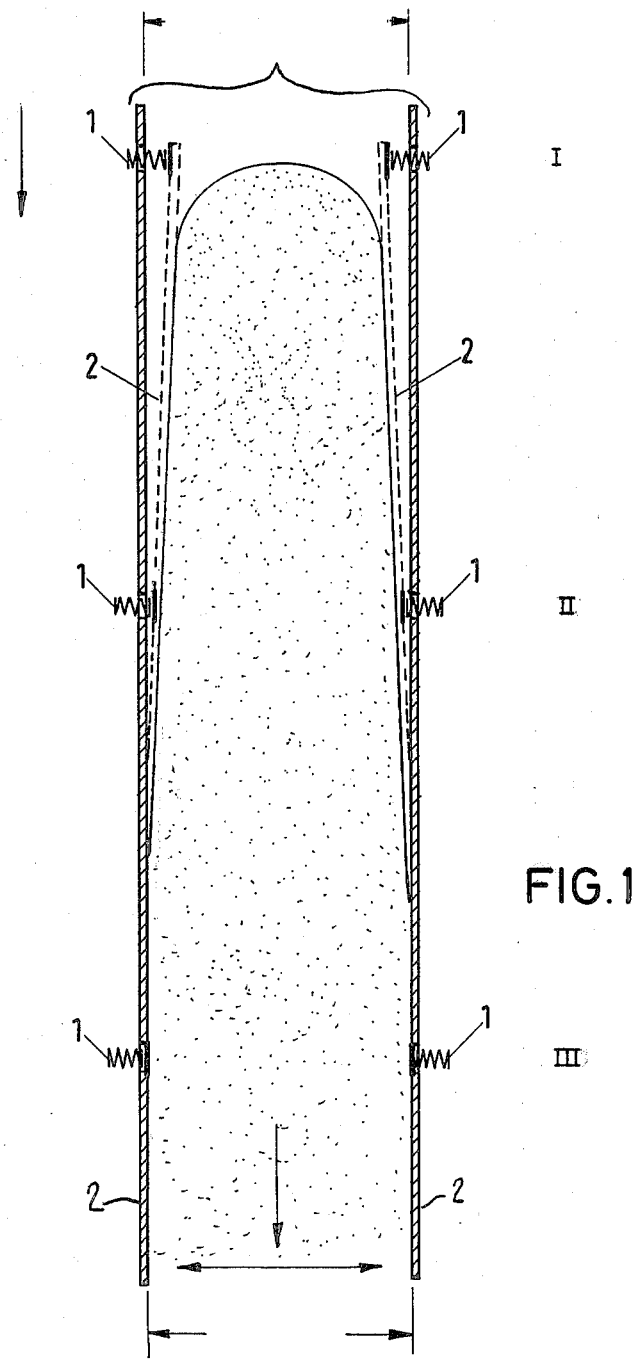
Figure 2:
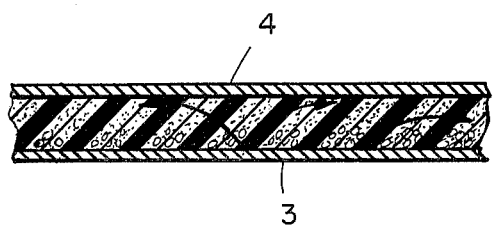
FIG. 2 shows the formation of hollow spaces on the lower covering layer, a more detailed description of this known phenomenon having already been given in the previous description.
Figures 3, 4:
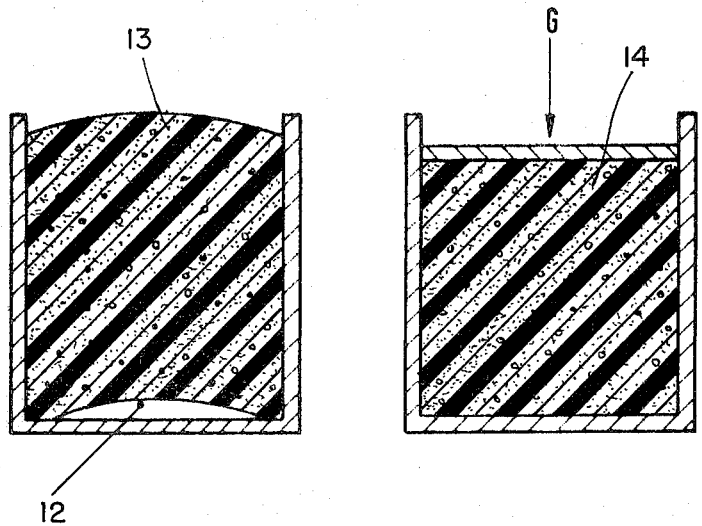
FIG. 3 shows the known formation of a hollow space 12 on the bottom of a discontinuous foamed block.
FIG. 4 shows a known device for the discontinuous production of shaped foamed blocks 14 with the use of the so-called "floating cover" which is appropriately loaded with weights to cause force G on the floating cover.
Figure 5:
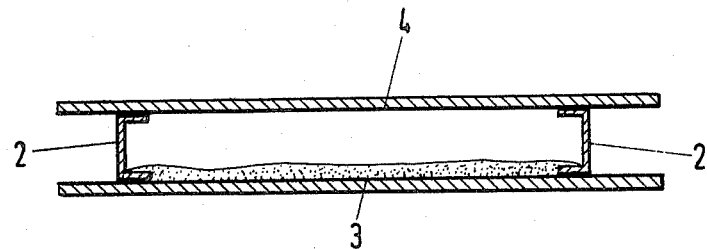

FIG. 5 shows, in cross-section, a schematic arrangement of the lower covering layer 3, of the upper covering layer 4 and of the two side bands 2, the counterpressure devices not being shown. The layer indicated by dots on the lower covering layer is to indicate the synthetic resin to be foamed.

Figure 6:
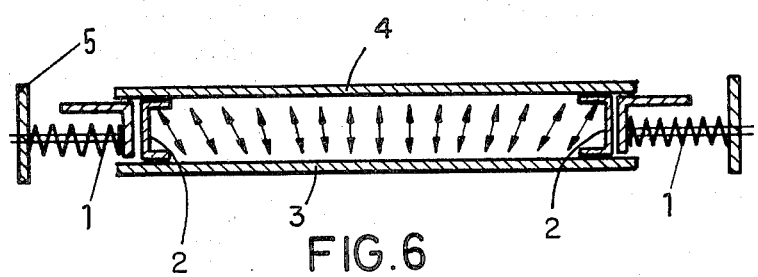

FIG. 6 shows, in principle, the same arrangement as in FIG. 5 but with the counterpressure devices 1, the side bands 2 not having yet assumed the final plate breadth but still pushing towards the middle by the counterpressure devices.

Figure 7:
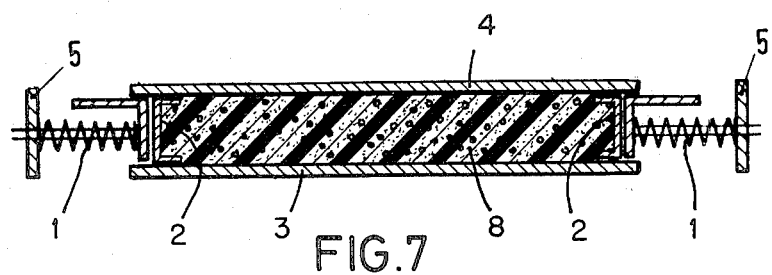

FIG. 7 shows, in cross-section, the same arrangement as in FIGS. 5 and 6 but with the side bands pushed back up to the stops 5 and thus into the final, side-limiting positions.

Figure 8:
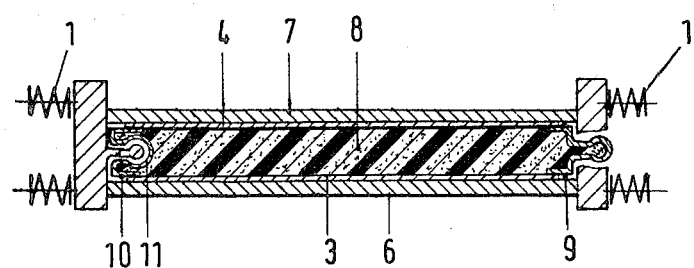

FIG. 8 also shows in cross-section the foam containing channel 8, the lower co-running band 6 on which is the lower covering layer 3, the upper co-running band 7 together with the upper covering layer 4, the non-co-running counterpressure devices 1 which, on the right-hand side, have a recess into which projects the tongue of the co-running profile band 9, and are securely connected on the left-hand side with the guide profile 11 in which the co-running groove profile 10 is guided.

In the following, the method of operation according to the present invention is further explained with reference to FIGS. 5 to 8 of the accompanying drawings:

The U-shaped side bands 2 (the simplest example) run between the upper (4) and the lower (3) covering layer into the plant.

1st phase: Into the rectangular hollow space formed by the two side bands 2 and the lower covering layer 3, there is introduced the foam material mixture, whereafter the upper covering layer is introduced.

2nd phase: The foam mixture begins to foam and the hollow space is filled with foam. The now expanding mixture presses with increasing force against the spring-loaded side bands in order to push them outwardly (see FIG. 6). It is important hereby to observe that the directions of foaming are, vertically and horizontally, chronologically displaced.

3rd phase: The reaction mixture has achieved its maximum expansion and the side bands are brought to the desired plate breadth. The stop 5 only now prevents a further expansion of the foam material.

As already mentioned, the side edges can be provided with tongue and groove profiles. The tongue and groove profiles can be made from rigid or flexible materials. The production of such inter-engaging profiles is known. There is a large number of embodiments of the nature, shape and material. The production of such profiles is not part of the present invention and all kinds can be used, without limitation. According to the present invention, it is preferred to use those tongue and groove systems which can be produced economically from thermoplastically shapable synthetic resins and are so constructed that they engage one another and thus, upon pulling, are stressable for the strengthening of the whole combined system. The foam material forces itself into the lateral hollow profiles and thus provides a firm hold between the profile and the foamed material plate. FIG. 8 shows the arrangement of the tongue and groove profiles in conjunction with the counterpressure devices according to the present invention.

SUMMARY OF THE REFERENCE NUMERALS USED IN THE ACCOMPANYING DRAWINGS 1 non-co-running counterpressure device
2 co-running side bands
3 lower covering layer
4 upper covering layer
5 stop
6 lower co-running band
7 upper co-running band
8 foam channel
9 co-running tongue profile
10 co-running groove profile
11 non-co-running guide profile which is connected with the non-co-running counterpressure device.

In a technically more laborious example, the side bands 2 can also be guided between the upper co-running band 7 and the upper covering layer 4 or the lower co-running band and the lower covering layer 3.

I claim:

1. A process for making a foamed synthetic resin panel which comprises pouring a liquid foamable synthetic resin mixture on an endless belt between laterally spaced endless running bands upstanding from the endless belt, allowing the said foamable mixture to foam and expand between said bands and exert a lateral pressure outwardly against the said bands, applying external pressure against the bands at longitudinally spaced points to overcome the pressure exerted by the foaming mixture and control separation of the endless bands with the pressure applied to said points decreasing progressively from point to point along the length of the endless belt until the bands are spaced apart a width equal to the desired width of the panel and allowing the foaming mixture to solidify while the bands are thus spread apart.

2. The product of the process of claim 1.

3. An apparatus for molding a synthetic resinous foam panel comprising a longitudinally movable endless belt having an upper reach, laterally spaced laterally movable pairs of facing endless bands upstanding from said upper reach and having lower edges forming a liquid impervious seal with said endless belt and forming an uninterrupted channel the length of the upper reach of said endless belt, and a series of facing resilient means disposed at spaced intervals along each side of said belt pressing said bands towards each other with a first pair of resilient means urging said bands closer together than any of the succeeding means, the last of said pairs of resilient means supporting the said bands apart a distance substantially equal to the width of the panel and the facing resilient means of the series between the said first and last facing resilient means being spaced progressively farther apart whereby the width of said channel increases gradually from the positions of the said first resilient means to the positions of the said last resilient means.

4. A device for taking up the lateral foam pressure in continuously operating band plants, comprising counterpressure devices which exert on the side bands, adapted to move in the plane of the plate, an optimum counterpressure for the reaction characteristics of the foaming synthetic resin.

5. A device according to claim 4, wherein the pressure means of the counterpressure devices comprise springs, the counterpressure action of which can be appropriately adjusted to the chronological foaming profile of the foam material.

6. A device according to any one of claims 4 or 5, wherein the counterpressure devices are adapted to be stopped in any desired position.

7. A device according to claim 6, wherein the counterpressure devices are adapted to be stopped in the minimum and maximum position.

8. A device according to any one of claim 4 or 5, wherein the side bands are provided with recesses for the reception of profiled co-running bands.

* * * * *